United States Patent [19]

Gordon et al.

[11] Patent Number: 5,168,574

[45] Date of Patent: Dec. 1, 1992

[54] SYSTEM AND METHOD FOR SWITCHING BETWEEN ANTENNAS IN A RADIO FREQUENCY BOOSTER

[75] Inventors: Robert T. Gordon; Michael W. Evans, both of Lynchburg; Samuel A. Leslie, Forest, all of Va.

[73] Assignee: Orion Industries, Inc., Solon, Ohio

[21] Appl. No.: 790,266

[22] Filed: Nov. 8, 1991

Related U.S. Application Data

[63] Continuation of Ser. No. 315,922, Feb. 24, 1989, Pat. No. 5,065,449, which is a continuation-in-part of Ser. No. 81,120, Aug. 3, 1987, Pat. No. 4,941,200.

[51] Int. Cl.$^5$ ............... H04B 1/60; H04B 17/02
[52] U.S. Cl. ................... 455/9; 455/15; 455/20; 455/277.1; 455/277.2
[58] Field of Search ............ 455/277, 8, 9, 15, 20, 455/23

[56] References Cited

U.S. PATENT DOCUMENTS

| | | | |
|---|---|---|---|
| 3,035,169 | 5/1962 | Griffith | 250/15 |
| 3,182,263 | 5/1965 | Gossard | 325/370 |
| 3,368,151 | 2/1968 | Verwey et al. | 455/277 |
| 4,255,816 | 3/1981 | Grunza et al. | 455/277 |
| 4,317,218 | 2/1982 | Perry | 455/54 |
| 4,549,311 | 10/1985 | McLaughlin | 455/277 |
| 4,584,713 | 4/1986 | Bruckert et al. | 455/277 |
| 4,696,058 | 9/1987 | Tachita et al. | 455/277 |
| 4,704,734 | 11/1987 | Menich et al. | 455/277 |
| 4,742,568 | 5/1988 | Furuya | 455/277 |
| 4,823,398 | 4/1989 | Hashimoto | 455/134 |
| 4,864,642 | 9/1989 | Ueno et al. | 455/277 |

*Primary Examiner*—Reinhard J. Eisenzopf
*Assistant Examiner*—Timothy H. Keough
*Attorney, Agent, or Firm*—Dressler, Goldsmith, Shore, Sutker & Milnamow, Ltd.

[57] ABSTRACT

A diversity receiving apparatus includes first and second antennas and circuitry for selecting one antenna or the other. Control circuitry analyzes signal strength received from the selected antenna and determines when the antennas should be switched. The antennas are switched when the received signal strength falls below a running average thereof; the received signal strength falls below a threshold value; or a predetermined time has elapsed since the antennas have been switched. The antennas are switched when the received signal strength falls below a running average thereof; the received signal strength falls below a threshold value; or a predetermined time has elapsed since the antennas have been switched.

3 Claims, 7 Drawing Sheets

SYSTEM AND METHOD FOR SWITCHING BETWEEN ANTENNAS IN A RADIO FREQUENCY BOOSTER

REFERENCE TO RELATED PATENT APPLICATION

The present patent application is a continuation of patent application Ser. No. 315,922, filed Feb. 24, 1989, now U.S. Pat. No. 5,065,449 issued Nov. 12, 1991, which is a continuation-in-part of application Ser. No. 081,120, filed Aug. 3, 1987, now U.S. Pat. No. 4,941,200 issued Jul. 10, 1991.

FIELD OF THE INVENTION

The invention pertains to boosters usable in cellular radiotelephone systems to improve intra-cell coverage. More particularly, the invention pertains to diversity reception of signals between the booster and the cell site, between the booster and another booster, or between the booster and a moveable cellular transceiver.

BACKGROUND OF THE INVENTION

Current cellular system implementations involve the use of a few to the use of many cells to cover a given geographical area. The cells are designed to provide some degree of overlapping coverage. They are also designed to allow reuse of the same channels several cells away (but within the same geographical area).

In practice, cellular system cell-site designs do not cover all the desired coverage areas due to anomalies of RF propagation. For example, a narrow depression in the terrain such as a ravine or along a road adjacent to a river bed may not have adequate signal coverage due to blockage from nearby terrain.

Another example would be in an underground parking garage, or even in large office buildings where larger than normal signal attenuation would result in unacceptable signal levels. Furthermore, cell sites in some cellular systems are not located close enough together, thus resulting in poor coverage areas between the cells.

The addition of new cell sites to remedy such problems is prohibitive in many cases. This is because the numbers of subscribers in these areas are generally of insufficient quantity to justify the cost of a new cell site installation.

A low cost alternative solution to this problem is to employ a cellular repeater or booster near the coverage area in question. Such a repeater is intended to retransmit the channels from a nearby (donor) cell into the problem area. The retransmitted channels can then be received by appropriate moveable transceivers or mobile units in the area. Likewise, transmissions from mobile units in the problem area can be retransmitted by the booster such that they can be detected by the channel receivers at the donor cell site. One such booster is disclosed in the commonly assigned patent application hereto, entitled Booster, U.S. Pat. No. 4,941,200 issued Jul. 10, 1991. That patent is hereby incorporated herein by reference.

Cellular systems employ diversity reception of the signals from the mobile to the cell site to overcome the effects of multi-path fading. However, if the signals are amplified by a booster, the multi-path fading occurs on both the path from the mobile to booster and the path from the booster to the cell site. As a result conventional methods of combining the diversity signals may not be effective.

An effective diversity combiner design must take into account the fact that the multi-path fading on each of these two paths has significantly different characteristics. This is because one path length is fixed and the other path length is changing rapidly due to vehicle movement. For example, the fades on the booster to cell path may experience typical fading durations of many seconds in contrast with the mobile to booster fading durations of a few milliseconds when the vehicle is moving.

Switch diversity combining is known. A receiver has two antennas that are separated in space a distance sufficient to uncorrelate the multi-path fading of the signals on the antennas. Only one antenna is connected to the receiver at one time. If the received signal falls below a fixed threshold level, the receiver is switched to the other antenna. This switching algorithm is not optimum for cellular systems boosters.

On the mobile to booster path, the multi-path fading is very rapid when the vehicle is moving, but very slow when the vehicle is stationary. To select the best antenna, the combiner must distinguish between these two conditions. Further, the threshold signal level for switching the antennas should be a function of the received average signal for optimum switching.

On the fixed path between the booster and the cell site or between two boosters, the multi-path fading is very slow and may not change significantly during the duration of one call. However, the signal received by the cell site or booster receiver may vary rapidly because the booster receiving signals from the moveable transceiver has not removed all the multi-path fading caused by the transceiver to booster path. The diversity combiner must ignore these rapid fades and select the antenna having the best average signal level. At the same time the selection must be rapid compared to the duration of a call.

SUMMARY OF THE INVENTION

An apparatus and method in accordance With the present invention implement an improved diversity receiving system. An apparatus in accordance with the present invention includes first and second antennas usable for receiving electro-magnetic signals. Circuitry coupled to the antennas senses incoming signal levels and selects, in accordance with a predetermined criterion, which of the antennas is to be used.

When the incoming signals are generated by a moving source, the circuitry repetitively samples a selected parameter value of the signals being detected off of the currently operative antenna. A running average of measured parameter values is formed.

Antennas are switched if a current sampled signal parameter value falls below, by a predetermined amount, the previously developed running average. In addition, the antennas are switched if the parameter value of a current sensed signal falls below a predetermined threshold. Finally, the circuitry switches antennas if a predetermined elapsed time has passed without a switch.

In the event that the signals being received are generated from a non-moving source, the circuitry switches antennas in the event that a predetermined time interval has elapsed and no switch has taken place. After the switch, a measured value of the selected parameter of the newly sensed signal is compared to the value of the same parameter sensed prior to switching antennas. In the event that the prior value exceeds the current value the antennas are again switched.

Numerous other advantages and features of the present invention will become readily apparent from the following detailed description of the invention and the embodiments thereof, from the claims and from the accompanying drawings in which the details of the invention are fully and completely disclosed as a part of this specification.

DETAILED DESCRIPTION OF THE PREFERRED EMBODIMENT

Figure 1:
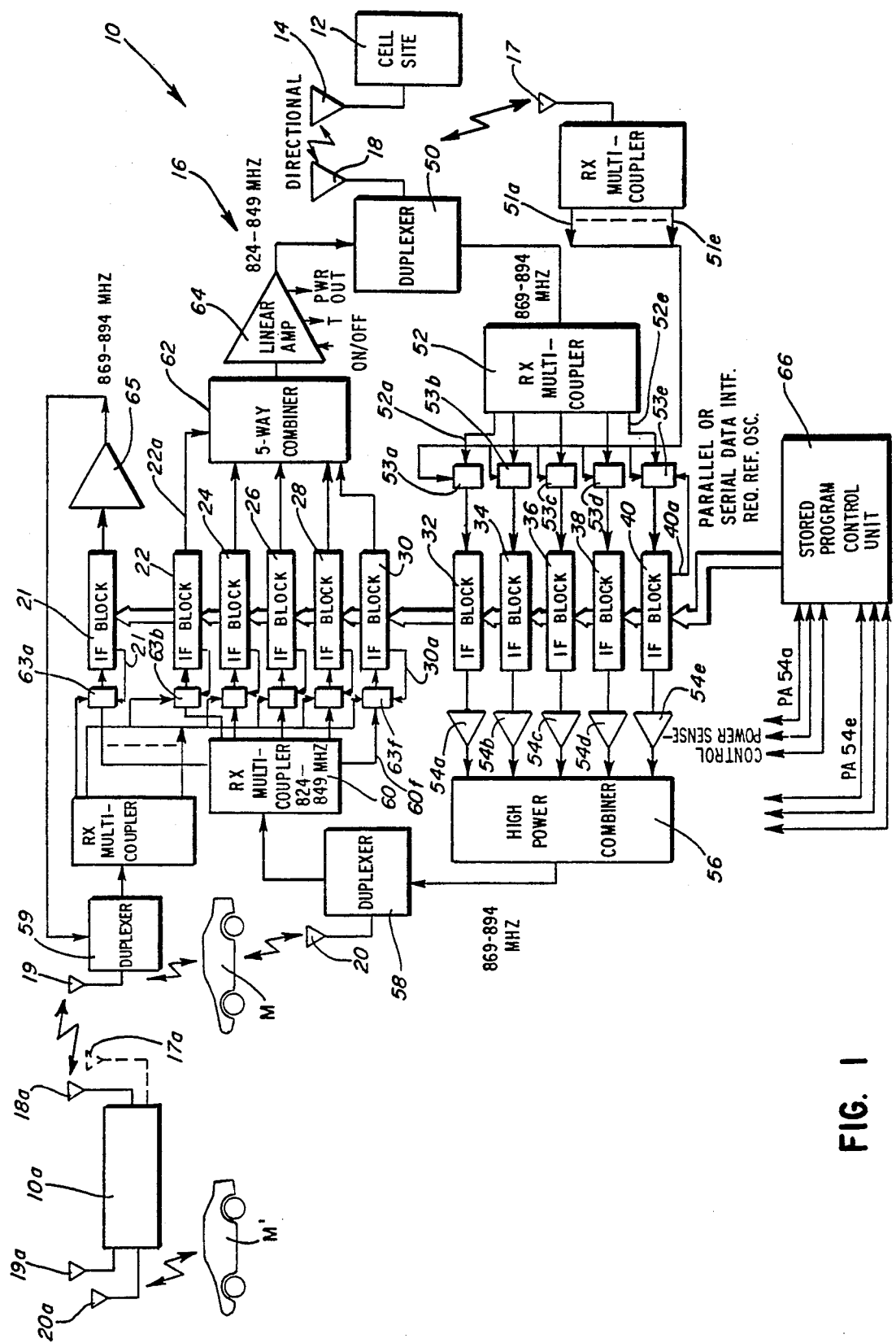
FIG. 1 is a block diagram of a portion of a cellular system that includes a booster in accordance with the present invention.
Figure 2A:
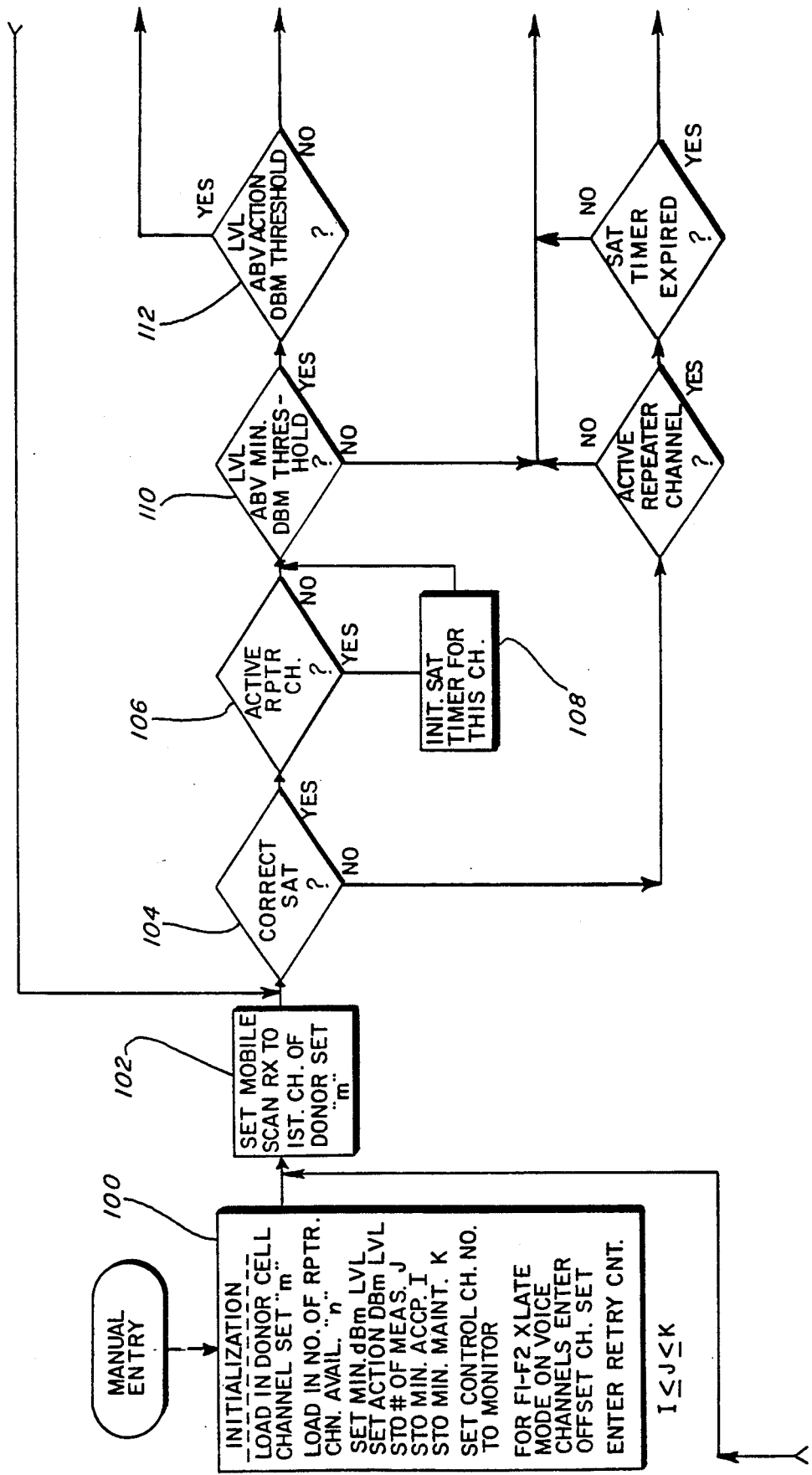
FIGS. 2A-2D taken together are a flow diagram of various modes of operation of the booster of FIG. 1.
Figure 2B:
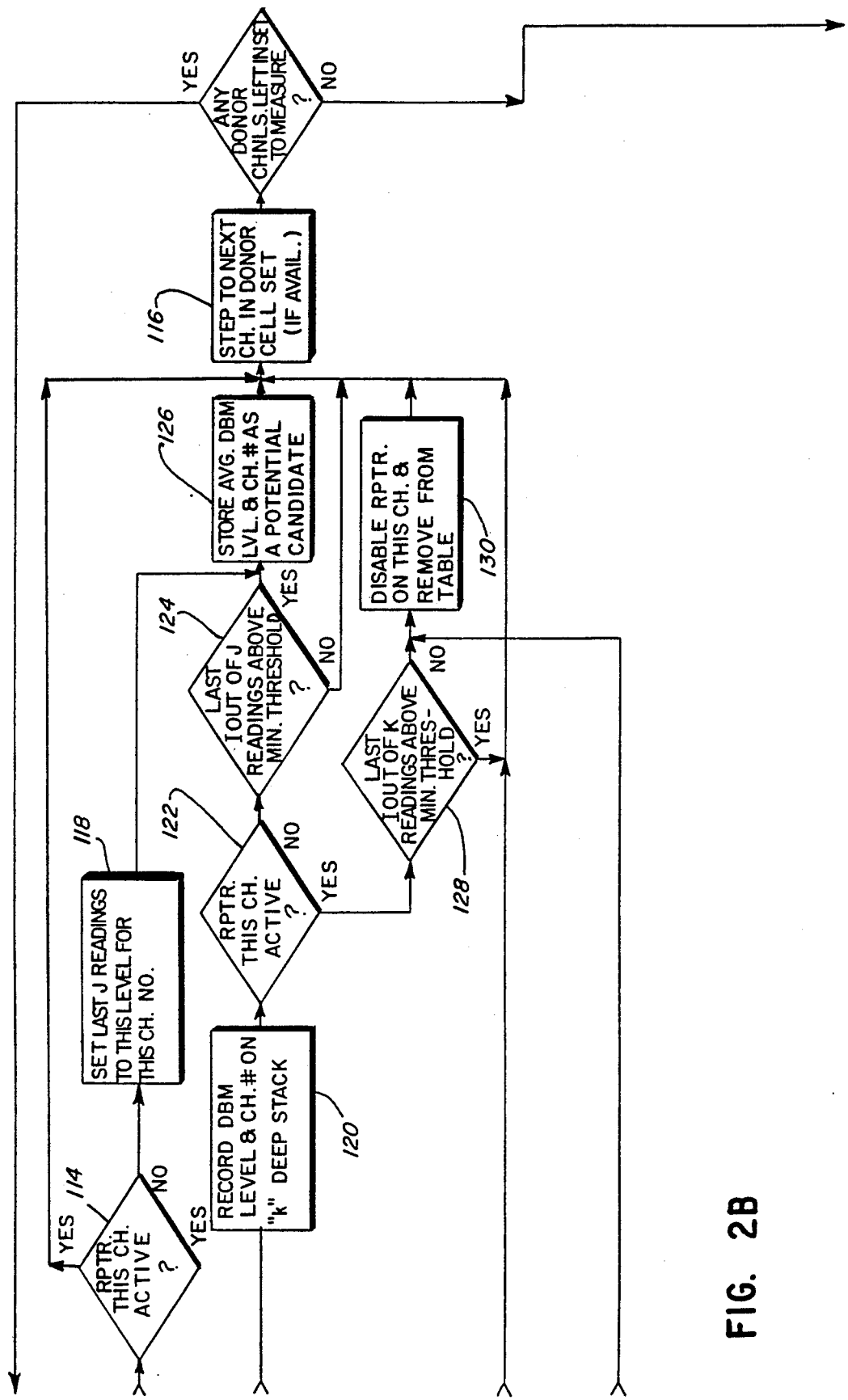
Figure 2C:
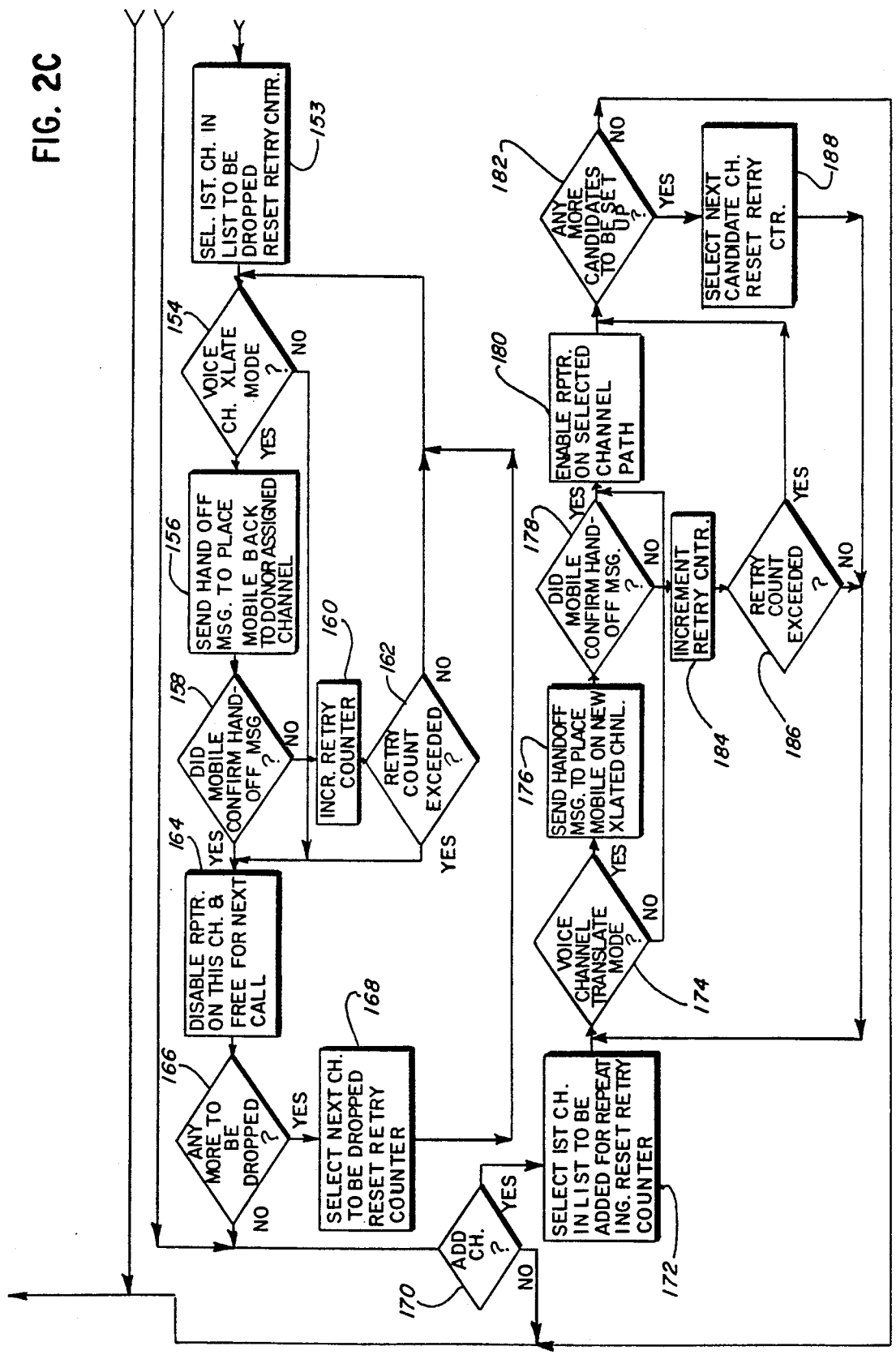
Figure 2D:
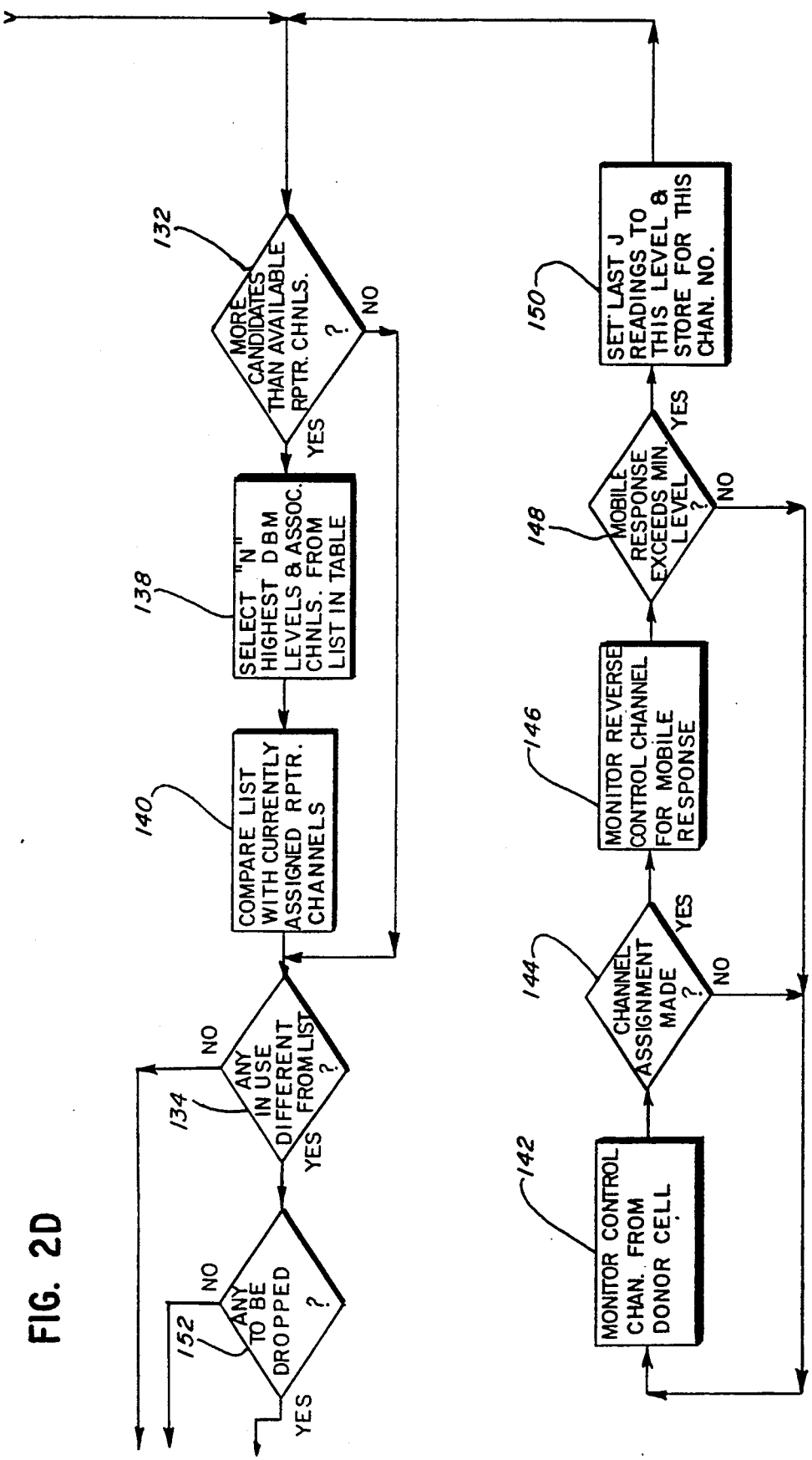

While this invention is susceptible of embodiment in many different forms, there is shown in the drawing and will be described herein in detail a specific embodiment thereof with the understanding that the present disclosure is to be considered as an exemplification of the principles of the invention and is not intended to limit the invention to the specific embodiment illustrated.

FIG. 1 illustrates a system 10 in accordance with the present invention. The system 10 includes a fixed cell site 12 of a conventional variety used in connection with cellular mobile radio telephone service. The cell site 12 includes a transmitting and receiving antenna 14.

A booster 16 is illustrated in FIG. 1 in bidirectional communication with the cell site 12 and a mobile unit M. The booster 16 includes a directional transmit and receive antenna 18 which is used to transmit signals to and receive signals from the cell site 12.

The booster 16 also includes a second antenna 20 for transmitting signals to and receiving signals from the mobile unit M. The antenna 20 can be, but need not be, a directional antenna.

The booster 16 can repeat both voice and control channels in connection with a cellular mobile transmission. The repeated channel can be repeated at the same frequency as received. Alternately, the booster 16 can shift the transmitted frequency from the received frequency.

The booster 16 includes a plurality of intermediate frequency communication paths such as channel paths 22-30 which provide for transmission of five channels of control or audio in parallel between the mobile unit M and the cell site 12. The booster 16 also includes a plurality of cell site to mobile communication paths 32-40 for transmitting five channels of control or audio between cell site 12 and the mobile M.

Each of the intermediate channels 22-30, and 32-40 is identical. Each shifts an incoming frequency down to a predetermined intermediate frequency for filtering (each includes a 30 K Hz bandwidth filter) for amplification. Each amplified intermediate frequency signal is then shifted up to a predetermined transmission frequency. Channel 21 has the same structure as do each of channels 22-30. Channels 22-30 and 32-40 are used for repeating incoming signals in accordance with a predetermined interior discussed subsequently. Channel 21 is used only for measuring incoming signals from mobil M and for transmitting hand-off messages to the mobile M.

Signals from the cell site 12 transmitted to the booster 16 and detected at antenna 18 pass through duplexer 50 and enter multi-coupler 52. The multi-coupler 52 provides RF amplification of low level signals. Output from the multi-coupler 52, on lines 52a-e, provides input to the communication paths 32-40 which, as discussed subsequently, are implemented as intermediate frequency transmission paths.

Output from each of the paths 32-40 is amplified in RF power output amplifiers 54a-e. Amplified outputs from the amplifiers 54a-e are combined in a high power lossless combiner 56. Alternatively, separate antennas may be employed for each RF power amplifier, or a very high power linear amplifier using distortion cancelling techniques may be used with a single antenna. The output from the combiner 56, on a single line 56a, is coupled to a duplexer 58. Output from the duplexer 58 is then transmitted via the antenna 20 to the mobile M.

Incoming signals received from the mobile unit M at the antenna 20 are coupled via the duplexer 58 to multi-coupler 60. Outputs from the multi-coupler 60 drive the intermediate frequency communication paths 22-30. Outputs from the paths 22-30 are combined in a five way combiner 62. The combined output from the five way combiner 62 is amplified in the linear amplifier 64. The output from the amplifier 64 provides an input to the duplexer 50.

Output from the duplexer 50 is coupled via the directional antenna 18 to the cell site 12. The intermediate frequency communication paths 21-30 and 32-40 operate under control of a stored program control unit 66.

Mobiles that are driving into the area served by the booster 16 are monitored for several scans thereof to determine the signal level trend before boosting or retransmission of the mobile is attempted. As a result, erroneous boosting of channels due to momentarily strong mobile signals can be minimized.

A specific transmission path can be provided for the control channel of the cell site 12 to allow mobile call originations or terminations to be completed for those mobiles which are not currently active but which are in the vicinity of the booster 16. The transmission path for the control channel may be purposely offset to provide F1-F2 repeater operation. For the same mobiles, an "action" threshold level is provided to allow quick response in setting up a boosted transmission path for a new call. This "action" threshold level is generally higher than the minimum threshold level. A signal exceeding this level is flagged for immediate action at the end of a scan. The mobile will transmit on the channel assigned by the cell site 12 for a maximum of five seconds without the presence of a correct supervisory audio tone being detected by the booster 16.

If the mobile signal exceeds the "action" threshold, a boosted transmission path will be placed on that channel within a couple of seconds. If the signal is below that threshold but above the minimum threshold, a boosted transmission path may be assigned within several seconds.

Weaker mobile signals that approach the minimum threshold will generally be in an area where some coverage is provided directly from the cell site 12. This provides adequate time for the booster 16 to average the readings and determine that a new channel is to be boosted.

Each of the intermediate frequency booster channels 21-30 and 32-40 is implemented with microprocessor controlled step down and step up frequency synthesizers. The use of two frequency synthesizers permits the offset of the control channel to another nearby control channel, as well as the offsetting of the voice channels. Channel 21 is implemented using similar circuitry. The above comments also apply with respect to the transmission paths 32 through 40 which are used for the purpose of boosting signals from the cell site 12 to the mobile M.

The stored program control unit 66 includes an 8031 Intel microprocessor. The processor provides overall control for the booster 16. It communicates with the other circuitry in the booster 16 via interface circuitry. The control unit 66 also includes a 10 kilobit data demodulator and a 6 kHZ supervisory audio tone (SAT) demodulator. The demodulator includes circuitry for decoding the 10 kilobit data stream which is utilized in the cellular system and for measuring which of the SAT frequencies is being transponded by the cellular mobile unit such as the mobile unit M.

The control unit 66 is utilized for maintaining signal level history for processing purposes as well as for controlling the frequency synthesizers, such as the synthesizers in each intermediate frequency branch 21-30, and 32-40. It is also used for setting the signal gain through each path as well as for measuring the received signal levels on each channel and for carrying out diagnostic and parameter setting functions.

A flow diagram, FIGS. 2A-2D, describes the sequence of events that takes place in determining candidate channels for boosting. All the channels of the cell site 12 are scanned. If the measured signal level from a mobile on any of the cell site channels exceeds a minimum preset threshold and also has the correct SAT frequency, that channel number and its signal level are recorded. A running history of the signal levels of the various mobiles that are active is maintained in a table. At the end of each channel-set scan the data in the table are analyzed to rank the signals by level. A determination is then made as to which signals are to be boosted or retransmitted.

The booster 10 of Figure includes additional hardware to implement the diversity receiving capability in accordance with the present invention. In addition to the antenna 20 a second antenna 19 is provided for diversity reception and also usable for hand off message transmission to mobile units. The antenna 19 is coupled to an antenna port of duplexer 59. Output from the duplexer 59 is coupled to a receiver multicoupler 61.

Parallel outputs from the receiver multicoupler 61 on a plurality of lines 61a through 61f are coupled by a plurality of radio frequency switches 63a through 63f to inputs to the intermediate frequency channels 21 through 30. Each of the radio frequency switches receives as a second input a corresponding signal line from the receiver multicoupler 60, lines 60a through 60f.

Each of the radio frequency switches, such as the switch 63a functions under the control of a microprocessor contained in the corresponding intermediate frequency block, such as the block 21. A command line, such as 21a, from the microprocessor signals the switch 63a as to which input is to be selected. The radio frequency switches can each be implemented using forward or reverse biased PIN radio frequency switching diodes.

In addition, the output of intermediate frequency channel 21 is coupled by a power amplifier 65 to the transmit input port of the duplexer 59. The amplifier 65 can be used to provide handoff message signals for transmission to the moveable transceivers such as portable units or the mobile unit M in the vicinity of the booster 10. Intermediate frequency channel or path 21 is used to either measure input signal levels from the moveable transceiver M or to transmit the previously noted handoff messages.

The booster 10 can also be equipped with a second directional antenna 17 directed toward the cell site 12. The second directional antenna 17 can be used to implement an optional diversity function with respect to transmissions from the cell site 12. The antenna 17 is coupled to an RF input port of multicoupler 51.

Output from multicoupler 51, on a plurality of lines 51a through 51e is in turn coupled to an input of a respective one of a plurality of RF switches 53a through 53d. The switches 53a through 53d are identical to each of the switches 63a through 63f.

Output from the multicoupler 52 provides a second input to each of the switches 53a through 53f. Each of the radio frequency switches 53a through 53f functions under the control of a microprocessor in one of the respective intermediate frequency channels 32 through 40. For example, a command line 40a between the intermediate frequency channel 40 and the radio frequency switch 53d causes that switch to select an input from either multicoupler 52 or multicoupler 51.

As an alternate to communicating directly with a mobile, such as the mobile M, the booster 10 can be used for the purpose of communicating with a second booster 10a. The booster 10a can in turn communicate directly with a mobile M'. The booster 10a can be implemented with two antennas, 19a, 20a for purposes of implementing diversity receiving function with respect to the mobile units, such as the mobile unit M'.

A single antenna 18a can be implemented at the booster 10a for the purpose of communicating with the booster 10. Alternately, a diversity antenna 17a, corresponding to the diversity receiving antenna 17, can be implemented at the booster 10a for the purpose of providing a diversity receiving function therein with respect to transmissions from booster 10.

As noted previously, fading on the mobile-booster path is very rapid when the vehicle is moving but very slow when the vehicle is stationary. On the other hand, on the fixed path between boosters or between a booster and a cell site, the fading is very slow and may not change significantly during a given call. In this instance it is important to ignore any high speed fading and select an antenna having the best average signal value.

Figure 3:
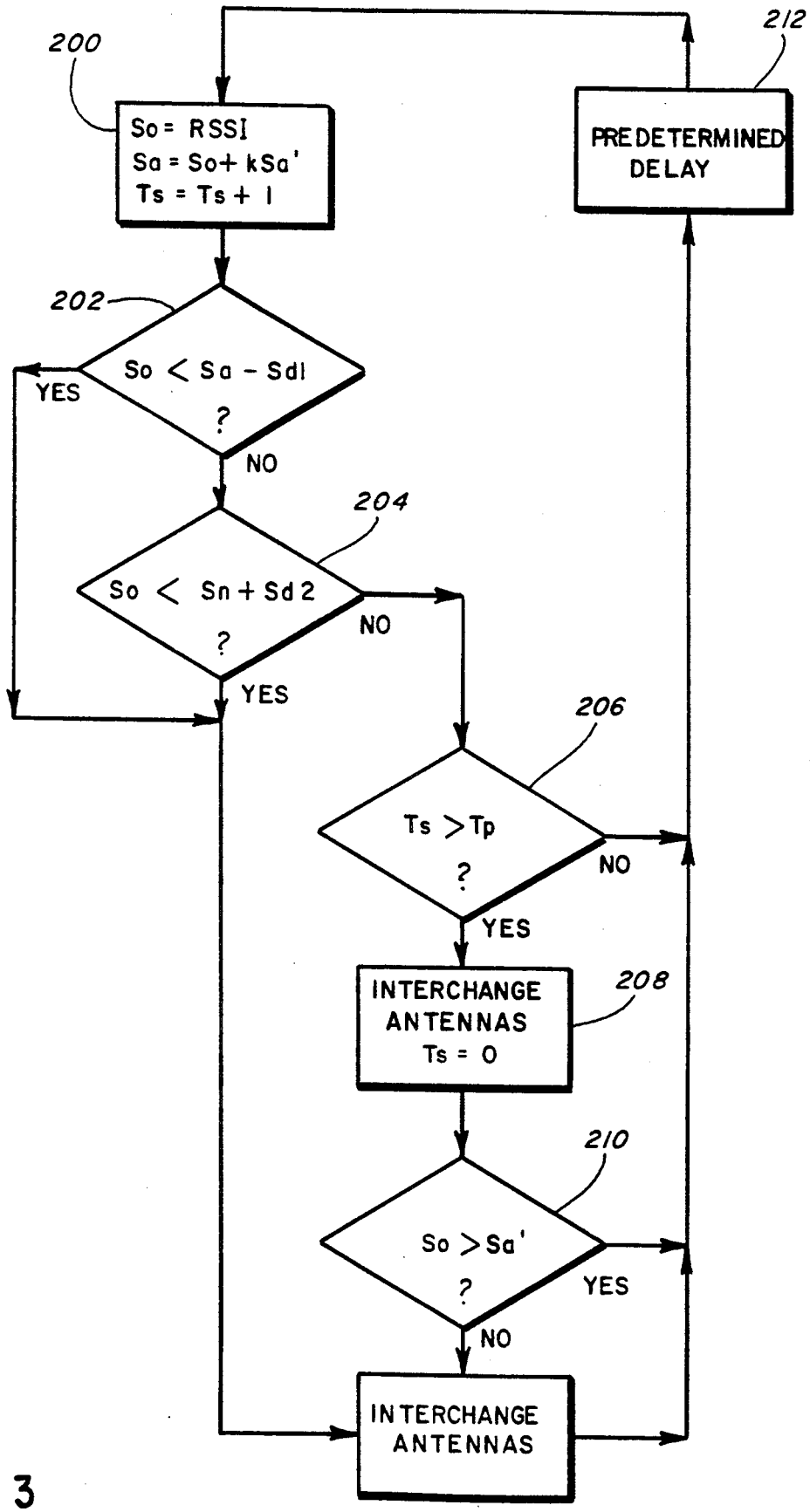
FIG. 3 is a flow diagram illustrating the operation of the booster of FIG. 1 during reception on the mobile to booster link.

FIG. 3 is a flow diagram of the steps of a method in accordance with the present invention for antenna switching on the mobile to booster path. The method implemented in the flow diagram of FIG. 3 is carried out by the respective controlling microprocessor in each of the intermediate frequency blocks 21-30. Such a microprocessor can be implemented, for example, as a 63C05 type microprocessor.

The following abbreviations are used on the flow diagram of FIG. 3:

RSSI—present received signal level (dBm)

So—present sample signal strength (dBm)
So'—signal strength of last sample
Sa—average signal strength
Sd1—hysteresis threshold 1 (dB)—on order of 10 dB
Sn—receiver noise floor (dBm)
Sd2—hysteresis threshold 2 (dB)—on order of 4 dB
Ts—time since last antenna switch
Tp—maximum antenna switch period—on order of 1 second In an initial step 200 the respective microprocessor, such as in the intermediate frequency channel 21, calculates and stores, every few microseconds, typically 250 microseconds, the average signal received on the selected antenna 19 or 20. Signal values are averaged over a longer predetermined period of time, typically a half second or so. In addition the time interval since the last switch of antennas is recorded.

Subsequently, in a step 202 the microprocessor determines whether or not the most recently sampled signal level off of the currently selected antenna is a predetermined number of dB below the precalculated average signal level. If so the antenna is switched. If antenna 19 had been selected antenna 20 will now be selected.

If the currently measured signal value is not the predetermined number of dB below the average signal value then, in a step 204, the processor determines whether or not the most recently measured signal value is less than a predetermined threshold value. If so the antennas are again interchanged. If not, the processor in a step 206 determines whether or not the time elapsed since the last interchange of antennas exceeds a predetermined period, typically one (1) second or so. If not the antennas are not interchanged and after a predetermined time interval, on the order of 250 μsec, the processor repeats the calculations.

If the antennas have not been interchanged during the last predetermined period, typically one second, the microprocessor in a step 208 interchanges the antenna and resets the time duration indicator to zero (0). In a step 210 the processor determines whether or not the present measured signal strength, after the antennas have been interchanged is greater than the previously measured signal strength. If so the newly selected antenna continues to be used. If not, the previously antenna is selected again.

The method of FIG. 3 operates independently in the control microprocessor of each of the channels 21-30. Hence, each such channel can independently switch between antenna 19 and antenna 20.

Figure 4:
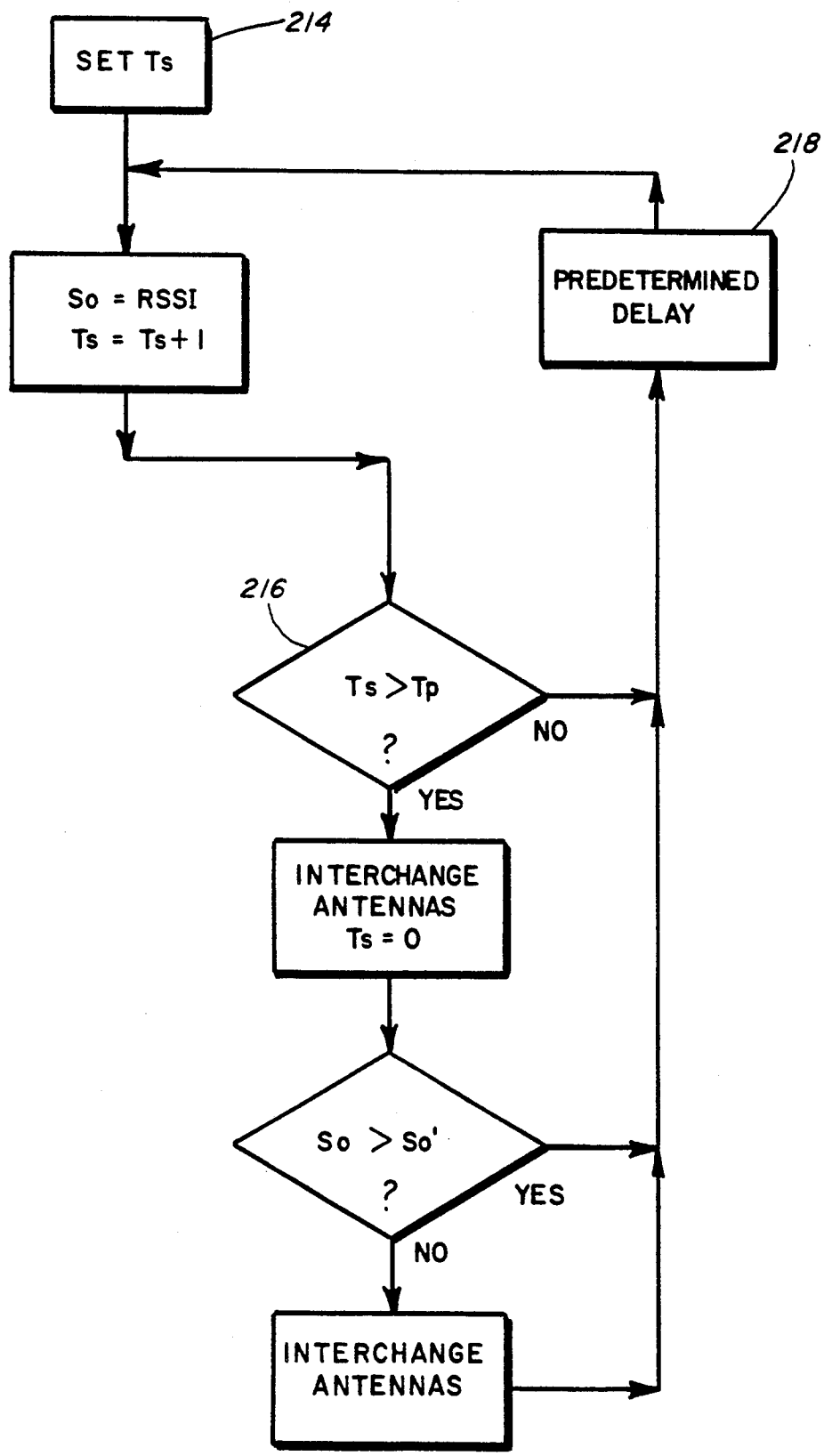
FIG. 4 is a flow diagram illustrating an alternative mode of operation of the booster of FIG. 1 during reception on the booster to cell site link or the booster to booster link.

FIG. 4 is a flow diagram illustrating the steps carried out by the microprocessor in the immediate frequency blocks 21-30 when the booster 10 is repeating signals generated by another booster 10a.

In addition, the method of FIG. 4 illustrates steps carried out by channels 32-40 when repeating signals, received via antenna 17 or antenna 18, from the cell site 12. In contradistinction to the flow diagram of FIG. 3 when the booster 10 is repeating signals from another booster 10a or the cell site 12, a longer predetermined period of time Tp, typically 60 seconds or so, causes the microprocessor to select the antenna with the strongest signal every minute or so.

Except for Tp, symbols used on the flow diagram of FIG. 4 have the same definitions as noted above with respect to the flow diagram of FIG. 3. Ts can be initially set to 60 in a step 214. Ts is compared to a preset value of Tp, on the order of 60 seconds, in a step 216.

After a delay 218 on the order of 250 μsec, the process can be repeated.

Each of the channels 21-30 or 32-40 carries out the above described analysis and antenna switching function independently of every other channel.

From the foregoing, it will be observed that numerous variations and modifications may be effected without departing from the spirits and scope of the novel concept of the invention. It is to be understood that no limitation with respect to the specific apparatus illustrated herein is intended or should be inferred. It is, of course, intended to cover by the appended claims all such modifications as fall within the scope of the claims.

What is claimed is:

1. A method of retransmitting, via an antenna, a plurality of electro-magnetic signals in a radio telephone system wherein the signals originate at one or more sources, the method comprising:
   establishing a plurality of retransmitting communications channels;
   detecting one or more received electro-magnetic signals from a first orientation relative to a respective source;
   detecting the one or more received electro-magnetic signals form a second orientation relative to the source;
   selecting as an input to each of the retransmitting communications channels one of the electro-magnetic signals detected from one of the orientations;
   determining a value of a selected parameter of the selected input to each of the communications channels from said selected orientation;
   determining independently for each channel if the electro-magnetic signal being retransmitted should be detected from the other orientation by comparing said value of said parameter to a selected value corresponding to one of a running average of previously determined parameter values associated with said selected orientation or a predetermined threshold value and radiating via the antenna the electro-magnetic signals form the retransmitting communications channels.

2. An apparatus for receiving electromagnetic signals from a remote source and for retransmitting one or more selected electromagnetic signals comprising:
   at least first and second antennas usable for receiving the electromagnetic signals;
   means, coupled to said antennas, for selecting one antenna or the other;
   means, coupled to said selecting means, for sensing one or more selected signals received from the selected antenna;
   means, coupled to said selecting and said sensing means, for determining which of said antennas is to be selected, said determining means including timing means for selecting one antenna during a first time interval and then the other during a second time interval after said first time interval and means for comparing a parameter associated with a received signal sensed using said one of said antennas during said first time interval to a corresponding parameter associated with said received signal sensed using said other antenna during said second time interval and for then selecting the one of said two antennas associated with a larger parameter value;
   means, coupled to said sensing means, for forming a group including one or more of said signals received from said selected antenna as candidates for retransmission pursuant to a predetermined group forming criterion;

means for selecting one or more members from said group pursuant to a predetermined retransmission criterion; and means for retransmitting said selected members.

3. A method of receiving electromagnetic signals from a remote source and for retransmitting one or more selected electromagnetic signals comprising:

providing at least first and second antennas usable for receiving the electromagnetic signals;

selecting one antenna and determining a parameter value of a selected signal received from that antenna and then selecting the other after a predetermined time interval, determining a corresponding parameter value of the selected signal received from the other antenna and comparing the parameter value associated with a received signal sensed using one of the antennas to the corresponding parameter value associated with the received signal sensed using the other antenna and then selecting the one of the two antennas associated with the larger parameter value;

sensing one or more signals received from the selected antenna;

identifying one or more of said signals as candidates for retransmission pursuant to a predetermined criterion;

selecting one or more identified members pursuant to a predetermined retransmission criterion; and retransmitting said selected members.

* * * * *

UNITED STATES PATENT AND TRADEMARK OFFICE
CERTIFICATE OF CORRECTION

PATENT NO.  : 5,168,574
DATED       : December 1, 1992
INVENTOR(S) : Gordon et al.

It is certified that error appears in the above-identified patent and that said Letters Patent is hereby corrected as shown below:

<u>In the Abstract</u>, please delete the second, duplicated sentence beginning "The antennas are switched ..".

Column 1, line 67, after "to", please insert --the--.

Column 2, line 42, please change "With" to --with--.

Column 4, line 2, please end the paragraph with "22-30." and start a new paragraph with --Channel 22-30 ...--.

Column 8, line 41, please change "form" to --from--.

Signed and Sealed this

Sixteenth Day of November, 1993

Attest:

BRUCE LEHMAN

*Attesting Officer*    *Commissioner of Patents and Trademarks*